(12) United States Patent
Crandell, III

(10) Patent No.: US 6,747,246 B2
(45) Date of Patent: Jun. 8, 2004

(54) INTEGRATED MOBILE TOOL AND WELDER POWER SUPPLY SYSTEM

(76) Inventor: John O. Crandell, III, 324 Capon Springs Grade, Star Tannery, VA (US) 22654

( * ) Notice: Subject to any disclaimer, the term of this patent is extended or adjusted under 35 U.S.C. 154(b) by 0 days.

(21) Appl. No.: 10/352,970

(22) Filed: Jan. 29, 2003

(65) Prior Publication Data

US 2003/0164645 A1 Sep. 4, 2003

Related U.S. Application Data

(60) Provisional application No. 60/361,322, filed on Mar. 4, 2002.

(51) Int. Cl.$^7$ .................................................. B23K 9/10
(52) U.S. Cl. .................................................. 219/130.1
(58) Field of Search ........................ 219/130.1, 130.21, 219/133; 307/150

(56) References Cited

U.S. PATENT DOCUMENTS

| | | | |
|---|---|---|---|
| 2,866,076 A | * 12/1958 | Aversten | 219/98 |
| 3,694,729 A | 9/1972 | Jones | |
| 3,769,571 A | 10/1973 | Wilkinson et al. | |
| 4,159,408 A | 6/1979 | Lifshits et al. | |
| 4,250,541 A | 2/1981 | Chang et al. | |
| 4,376,250 A | 3/1983 | Baker, Jr. et al. | |
| 4,705,934 A | * 11/1987 | Winkler | 219/137 PS |
| 4,868,480 A | 9/1989 | van der Linde | |
| 4,876,433 A | 10/1989 | Kashima et al. | |
| 4,950,972 A | 8/1990 | Berg | |
| 5,077,652 A | 12/1991 | Faley | |
| 5,086,208 A | 2/1992 | Habermann | |
| 5,170,336 A | 12/1992 | Getter et al. | |
| 5,189,361 A | 2/1993 | Meier | |
| 5,250,786 A | 10/1993 | Kikuchi et al. | |
| 5,355,300 A | 10/1994 | Zinn | |
| 5,373,196 A | 12/1994 | Faley | |
| 5,410,126 A | * 4/1995 | Miller et al. | 219/130.1 |
| 5,601,741 A | 2/1997 | Thommes | |
| 5,712,771 A | 1/1998 | Fitter et al. | |
| 5,831,240 A | 11/1998 | Katooka et al. | |
| 5,908,575 A | 6/1999 | Smith et al. | |
| 6,051,806 A | 4/2000 | Shikata et al. | |
| 6,111,215 A | 8/2000 | Lilly | |
| 6,130,398 A | 10/2000 | Schneider et al. | |
| 6,144,190 A | 11/2000 | Scott et al. | |
| 6,175,217 B1 | 1/2001 | Da Ponte et al. | |
| 6,188,585 B1 | 2/2001 | Ikeda et al. | |
| 6,194,681 B1 | 2/2001 | Moriguchi et al. | |
| 6,225,596 B1 | 5/2001 | Chandler et al. | |
| 6,229,288 B1 | 5/2001 | Baretich et al. | |
| 6,313,431 B1 | 11/2001 | Schneider et al. | |
| 6,313,449 B1 | 11/2001 | Smith et al. | |
| 6,329,636 B1 | 12/2001 | Geissler | |

FOREIGN PATENT DOCUMENTS

| | | | |
|---|---|---|---|
| DE | 2650522 A1 | * | 5/1978 |
| GB | 2316244 A | * | 2/1998 |

* cited by examiner

*Primary Examiner*—Clifford C. Shaw
(74) *Attorney, Agent, or Firm*—Rosenberg, Klein & Lee

(57) ABSTRACT

An integrated mobile tool and welder power supply system includes a primary DC power source coupled to a power supply chassis for supplying DC power to DC-operated power equipment such as welders and AC power to AC-powered equipment such as standard AC power tools. The power supply chassis houses a power inverter for transforming DC power from the primary DC power source into AC power and one or more power converters for supplying a recharging current to the primary DC power source from one or both of an external AC power source or an external DC power source. The power supply system can be configured such that if an external AC power source is available, that AC power source is electrically coupled to an AC output terminal for supplying AC-powered tools. In one embodiment, the switching of AC output power from the power inverter to the external AC power source may be overridden by means of an AC output mode selection switch. In another embodiment, the system is equipped with a DC transfer switch, a motor drive output and a motor demand indicator input so that a DC motor (e.g., the welding wire spool feed motor DC welder) may be driven from a regulated DC power source as opposed to the unregulated primary DC power source.

28 Claims, 6 Drawing Sheets

INTEGRATED MOBILE TOOL AND WELDER POWER SUPPLY SYSTEM

REFERENCE TO RELATED APPLICATIONS

This Patent Application is based upon Provisional Patent Application Serial No. 60/361,322 filed at the U.S. Patent and Trademark Office on Mar. 4, 2002.

FIELD OF THE INVENTION

This invention generally relates to power supplies. More particularly, this invention relates to self-contained mobile power supplies for providing DC power to welding equipment and, simultaneously, AC power to conventional AC-powered tools.

BACKGROUND OF THE INVENTION

Typical arc welding applications consist of a high current capacity electrode at a predetermined DC potential and a high current capacity electrode at ground potential electrically coupled to a metallic workpiece. As the non-zero potential electrode is moved towards the workpiece, a free-space current stream, or arc, develops, wherein sufficient heat is generated to melt the metal and create a weld. Due to the high current requirements of DC welding, DC welding power supplies are traditionally bulky and not easily transported.

PRIOR ART

Arc welding power supplies generally fall within three categories—power is derived from an AC power grid power, power is derived from a gasoline generator or power is derived from an internal DC source such as storage batteries. Arc welding power sources that derive DC welding power from an AC grid power, such as generated by public utility companies, can be made small and mobile, but must always be located near an AC outlet or tap. Thus, such power supplies may not be utilized in remote locations where AC power is unavailable. Arc welding power supplies that derive power from a gasoline driven generator can be located where AC power is unavailable, but typically are heavy, are noisy, require a supply of gasoline and pollute the atmosphere. Power supplies that derive welding current from internal storage batteries are self-contained, but are not equipped to provide power to AC tools such as grinders, circular saws, drills, etc.

Several portable electric power supplies wherein the primary power is taken from one or more DC storage batteries are known in the prior art. For example, U.S. Pat. No. 6,225,596 to Chandler, et al., discloses a portable welding unit comprising a housing containing a pair of series connected batteries therein. The welding unit has a ground clamp and cable connected to the positive terminal of the first battery and a welding gun and cable electrically connected to the negative terminal of the second battery. The unit also encloses a wire feed mechanism for feeding wire through the welding gun from a spool rotatably connected to the housing. Whereas the system of Chandler provides a compact self-contained DC welding power supply, there is no provision for operating AC power tools therefrom.

U.S. Pat. No. 3,694,729 to Jones discloses a portable electric power device in which a battery pack is housed to provide power for DC-operated tools. As is the case with the portable welding unit of Chandler, et al., the power supply of Jones does not incorporate means for operating AC power equipment.

U.S. Pat. No. 4,376,250 to Baker, Jr., et al., is directed to a portable power source providing alternating power for power devices derived from a plurality of DC storage batteries, or the like. The system includes a power inverter for transforming DC power into usable AC output power and a battery charger from which external AC power is converted into DC power with which the storage batteries are recharged. The system does not provide means for supplying a large quantity of DC current to a DC-operated tool such as a welder. Further, since the primary DC current is inverted to form an alternating current, diverting the majority of DC current to operate a welder would seriously effect the supply's ability to provide sufficient AC power.

U.S. Pat. No. 5,410,126 to Miller, et al., discloses a portable AC/DC wire feed welder which includes a mechanism to receive either AC or DC power and a selector mechanism to selectively activate the external DC source mode, an external AC source mode, and an internal AC source mode. The housing of the welding unit is fitted with an AC outlet for providing power to AC tools, however, AC power thereat is available only when an external AC power source is coupled thereto.

As can be drawn from the limitations of devices representing the prior art, there exists a need for a DC arc welding power supply for use in remote locations that is lightweight, compact, self-contained, and does not require flammable fuel. Moreover, the power supply should include an AC power source capable of driving conventional AC power tools.

SUMMARY OF THE INVENTION

An integrated mobile tool and welder power supply system of the present invention includes a primary DC power source coupled to a DC output terminal for supplying DC power to a DC-operated tool such as a welder, and further coupled to a power inverter for converting DC power to an inverted AC power signal for supplying AC power to AC-operated power tools. The integrated mobile tool and welder power supply system includes an AC power detector for detecting an external AC power signal such that when external AC power is available, AC-operated power tools may be operated by power from the external AC source rather than the power inverter. The integrated mobile tool and welder power supply further includes at least one power converter for converting an AC power signal or a DC power signal to a DC power signal for replenishing the primary DC power source to an optimal power level.

In another embodiment of the present invention, the integrated mobile tool and welder power supply includes a DC transfer switch coupled to a DC-DC power converter, a DC motor supply terminal, a motor demand indicator terminal, and the primary DC power source for supplying regulated power to a DC motor such as the welding wire spool motor found on some portable welders. When it is determined via the motor demand indicator terminal that the DC motor requires DC power, the transfer switch configures a current path, wherein motor power is taken from the output terminal of the DC-DC power converter and the DC-DC power converter takes at its input terminal DC power from the primary DC power source. This configuration of the invention allows the spool motor of a portable DC welder to operate independently of the primary DC power source so as to maintain a constant speed regardless of the load on the primary DC power source.

DETAILED DESCRIPTION OF THE PREFERRED EMBODIMENTS

Figure 1:
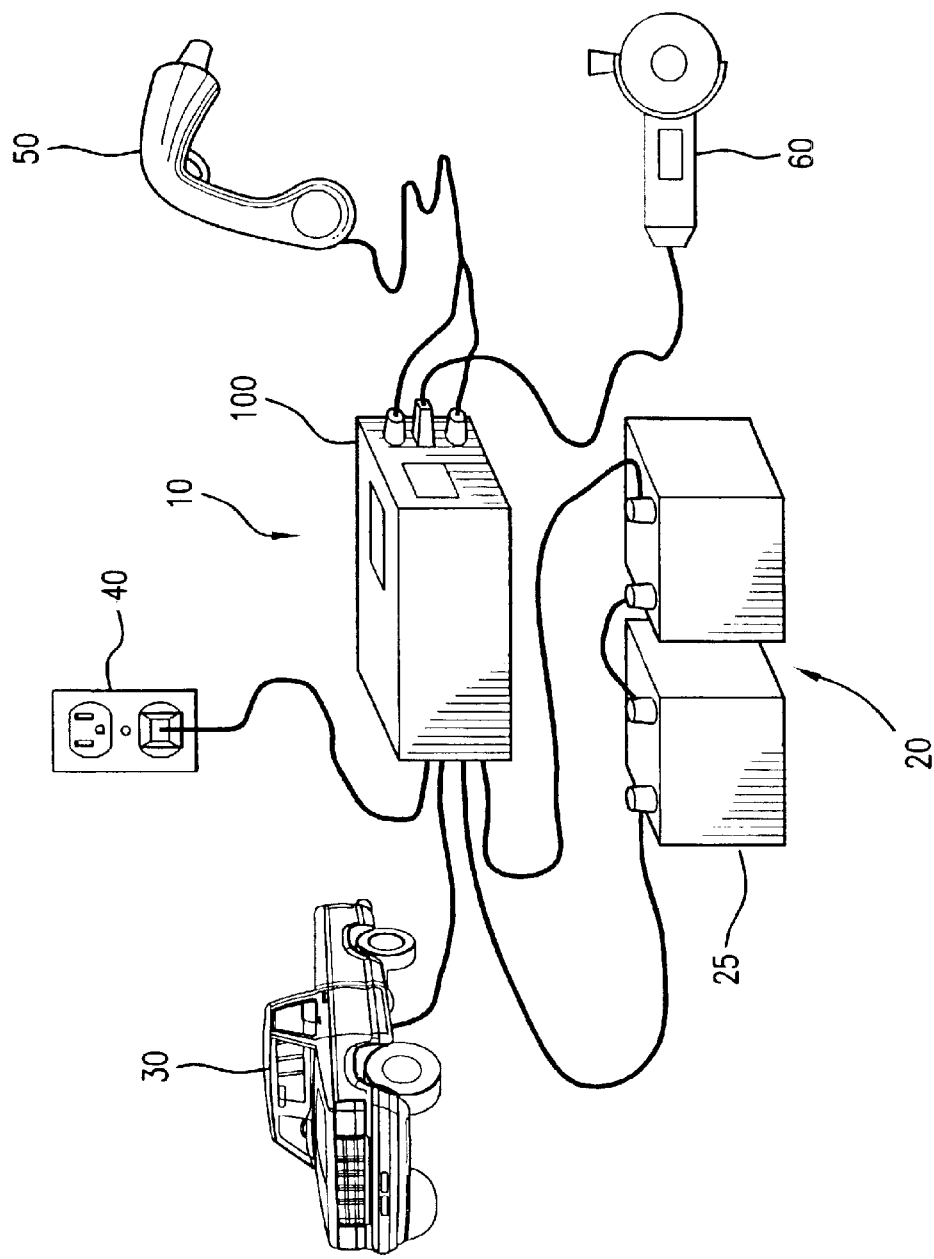
FIG. 1 is an illustration providing system overview of the present invention.

A fundamental implementation of the mobile tool and welder power supply system of the present invention is illustrated in FIG. 1. The integrated mobile tool and welder power supply system, indicated generally at 10 and alternatively referred to hereinafter as the mobile power supply 10, consists of a power supply chassis 100, to be described in detail in following paragraphs coupled to a primary DC power source 20, shown as a battery bank 25 of two storage batteries connected in series. Primary DC power source 20 supplies power supply chassis 100 with DC current. Power supply chassis 100 houses the necessary circuitry to transfer DC power to a DC-operated power tool 50, such as a DC welder, and to convert DC current into a suitable AC current for supplying AC power to AC-operated power tool 60, such as a surface grinder. As such, mobile power supply 10 may be easily deployed where power is otherwise unavailable so that work requiring power tools may nevertheless be carried out. Thus, the mobile tool and welder power supply system is particularly useful for supplying power to tools in conducting repairs on remote equipment.

Power supply chassis 100 further encloses circuitry for replenishing the primary DC power source 20 to its optimum storage level. The replenishing, or recharging circuitry accepts at its input an external AC source 40, e.g., standard American household current, or an external DC power source 30, e.g., an automotive power bus. External AC power source 40 and external DC power source 30 may be coupled to power supply chassis 100 either simultaneously or separately, i.e., if both an AC power source and a DC power source are available, both may be used concurrently to replenish the primary DC power source. However, if only one external power source is available, it alone may be used for recharging the primary DC power source 20.

Mobile tool and welder power supply 10 is capable of simultaneously providing DC output power for welding operations and providing AC output power for various power tools while, at the same time, recharging the primary DC power source 20 from either or both of external AC power source 40 and external DC power source 30. Thus, mobile power supply 10 may furnish output power continuously if connected to a replenishing power source. However, the present invention need not be coupled to a recharging power source to supply output power.

Figure 2:
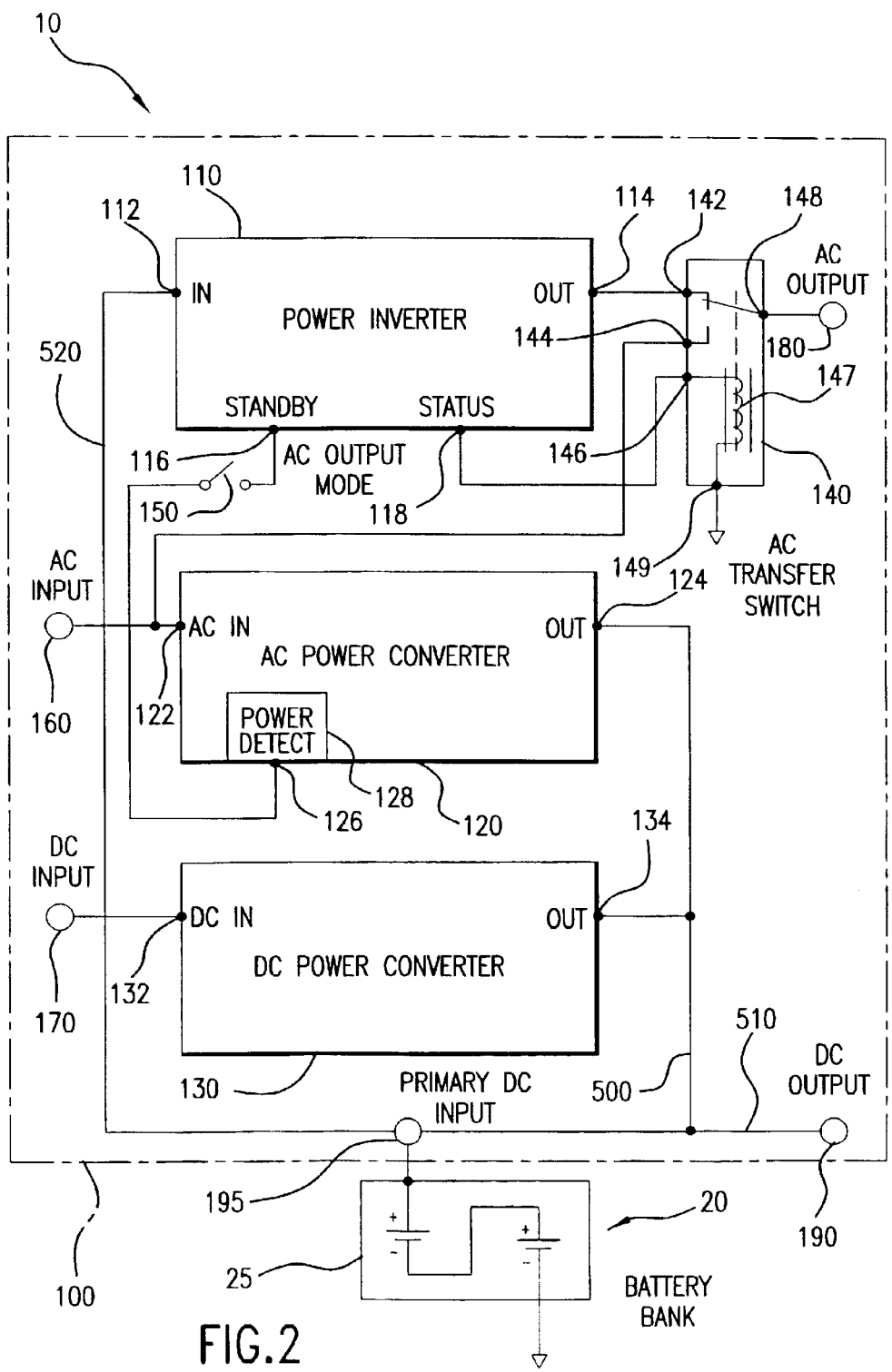
FIG. 2 is a block diagram illustrating a first embodiment of the present invention.

A first embodiment of the present invention is illustrated in FIG. 2. As indicated hereinabove, mobile power supply 10 consists of power supply chassis 100 coupled to primary DC power source 20. Primary DC power source 20 is preferably a bank 25 of series-connected DC storage batteries and is coupled to power supply chassis 100 at primary DC input terminal 195.

Primary DC input terminal 195 defines a distribution point from which DC current is drawn through DC supply lines 510 and 520, and to which DC recharge current is supplied via DC supply line 500. The components of power supply chassis 100, discussed in detail hereinbelow, are individually buffered and isolated to prevent system malfunction by either component failure due to damage, or by load/supply incompatibilities (e.g., input and output impedances and supply/load mismatch). Thus, a recharging current may be present on DC supply line 500 and a DC output current may be present on DC supply lines 510 and 520, simultaneously, without interference from loading by the input or output impedances of the surrounding system components. This allows battery bank 25 to be replenished to its optimal power level even when mobile power supply 10 is under load conditions.

DC power is provided for use by DC-operated power equipment through DC output terminal 190. DC output terminal 190 is directly coupled to primary DC input terminal 195, i.e., DC output power is taken directly from battery bank 25 as supplemented by a DC recharging current, if available. In a preferred embodiment, primary DC power source 20 is not isolated, regulated, or otherwise buffered at its output. However, as previously discussed, components of power supply chassis 100 are sufficiently buffered to insure proper operation when the primary DC power source 20 is under heavy load through DC output terminal 190. While the components of power supply chassis 100 are sufficiently buffered, and buffering the primary DC power source 20 at its output is generally unnecessary, such buffering of the primary DC power source 20 could be implemented without deviating from the intended purposes and goals of the present invention.

In a preferred embodiment of the invention, DC output terminal 190 is electrically isolated from both power supply chassis 100 and DC input terminal 170. This configuration allows welding operations to be performed on equipment from which mobile power supply 10 is drawing DC current and to which DC input terminal 170 is coupled. As is shown in FIG. 1, due to the electrical isolation of DC output terminal 190, repairs requiring welding may be carried out on vehicle 30 while mobile power supply 10 draws DC power therefrom via DC input terminal 170 to replenish primary DC power source 20.

Power supply chassis 100 houses a plurality of power conversion modules which, in preferred embodiments, include a power inverter 110 for transforming DC power drawn from the primary DC input terminal 195 into an AC output power for use by AC-operated power equipment, an AC power converter 120 for transforming an external AC power signal into a DC recharging current, and a DC power converter 130 for transforming an external DC power signal at a predetermined voltage level into a DC recharging voltage at the power supply output voltage. Each of the three power conversion modules and the interaction therebetween will now be discussed in detail.

Power inverter 110 is supplied DC power from battery bank 25 at power inverter input terminal 112 through DC supply line 520. Power inverter 110 is configured with both input and output voltage regulation such that an AC output voltage of predetermined magnitude and at a predetermined frequency is discharged on power inverter output terminal 114 for a predetermined range of DC input voltage levels presented at power inverter input terminal 112. Furthermore, the DC input voltage level on supply line 520, i.e., power inverter input terminal 112 is not affected by AC circuit loading at power inverter output terminal 114, provided that the AC circuit loading falls within a predetermined range. Power inverter 110 further exhibits a high input capacitance at power inverter input terminal 112 to prevent the voltage droop caused by sudden DC circuit loading at DC output terminal 190 from lowering the DC input voltage beyond the required range for optimum AC output regulation at power inverter output terminal 114.

Power inverter 110 is further equipped with two indicating and control terminals: a standby terminal for placing power inverter 110 into a standby mode and a status terminal for indicating the operational status of power inverter 110. In a preferred embodiment, a logic level "1" on standby terminal 116 inhibits power inverter 110 from supplying an AC power signal to power inverter output terminal 114. Alternatively, a logic level "0" at standby terminal 116 places power inverter 110 in its normal operating mode, i.e., providing an AC power signal to power inverter output terminal 114. When power inverter 110 is in its normal operating mode, a logic level "0" is output on status terminal 118. If power inverter 110 is in a state other than normally operating, a logic "1" is placed on status terminal 118. Thus, in preferred embodiments, the output on status terminal 118 can be controlled by a signal on standby terminal 116. This control and indicating arrangement affords means by which the source of AC output power may be switched, as discussed further in paragraphs that follow.

AC power converter 120 receives at its input terminal 122 an AC current from an optionally provided external AC power source coupled to AC input terminal 160 and transforms the AC current into a DC recharging current at its output terminal 124. AC power converter 120 is buffered and regulated in a fashion similar to power inverter 110 with an added recharging current regulation function at AC power converter output terminal 124. The recharging current regulator controls the DC output current at AC power converter output terminal 124 based upon a sensed power level (voltage level) already at AC power converter output terminal 124. A sensed voltage that is lower than a predetermined nominal voltage level results in a larger recharging current at AC power converter output terminal 124 so as to return the sensed voltage level to a predetermined nominal value. Thus, when an external AC power source is available, primary DC power source 20 is continuously recharged and the voltage at DC output terminal 190 remains constant under varying load conditions. This is especially useful during welding operations when a high level of DC output power is required for a period of time and then followed by a period of non-use. During high load periods, such as during the start-up current surge of the DC welder, DC recharging current from AC power converter 120 supplements the current from battery bank 25. During the periods for which the DC welder is not in use, AC power converter 120 supplies DC recharging current to battery bank 25 through DC supply line 500.

The input circuitry of AC power converter 120 includes an AC power detector 128 for sensing the presence of an AC power signal at AC power converter input terminal 122. If AC power is present at AC power converter input terminal 122, as sensed by the power detector, a logic level "1" is output on power detect terminal 126. Power detect terminal 126 of AC power converter 120 is electrically coupled to standby terminal 116 of power inverter 110 for controlling the source of AC output power as will be discussed in paragraphs that follow.

While AC power detector 128 has been described and shown as a component integral to AC power converter 120, other configurations are within the scope of the present invention. AC power detector 128 may be a discrete component of mobile power supply 10 or may be integrated into one of the other power conversion modules. In one embodiment, AC power detector 128 is embedded in power inverter 110, which may also house AC transfer switch 140, as shown in FIG. 3.

Figure 3:
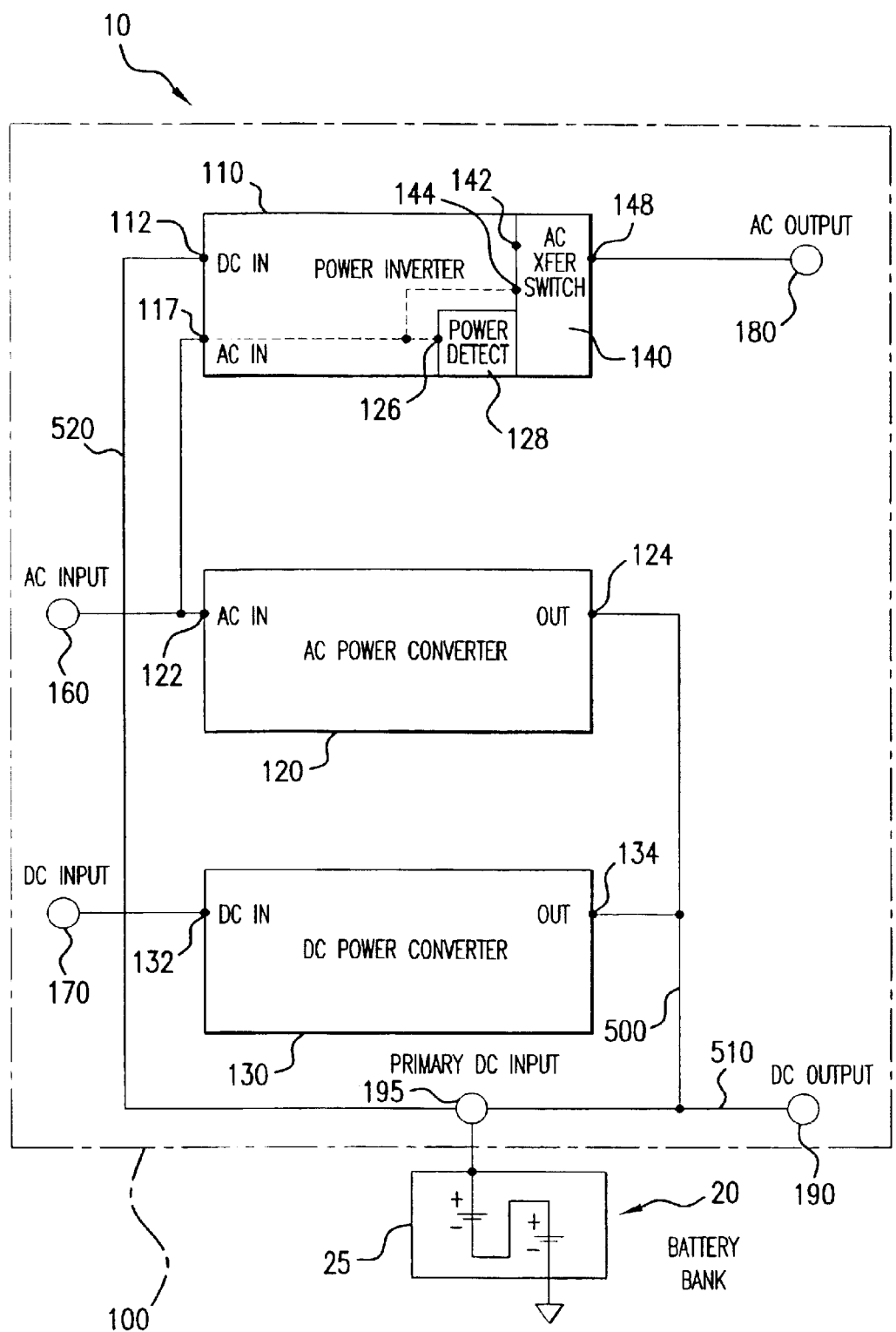
FIG. 3 is a block diagram illustrating a second embodiment of the present invention.

In the embodiment of FIG. 3, AC power detector 128 and AC transfer switch 140, the function of which will be described in detail below, are integral to power inverter 110. Power inverter 110 is coupled to DC power at power inverter DC input terminal 112 and is coupled to AC power at power inverter AC input terminal 117. AC power is then coupled to power detect terminal 126 of AC power detector 128 and to AC transfer switch terminal 144. AC transfer switch is also coupled to converted AC power from power inverter 110 at terminal 142. In a manner to be discussed in detail below, AC output power is presented to output terminal 148 from an external AC source when AC power is detected at AC power detector 128. Otherwise, AC power at output terminal 148 is derived from power inverter 110.

Returning now to the embodiment of FIG. 2, power inverter 110 and AC power converter 120 are connected to AC transfer switch 140 for switching the source of AC power supplied to AC output terminal 180 between the output of power inverter 110 and the external AC power source as furnished to AC input terminal 160. AC transfer switch 140 includes a normally closed terminal 142, a normally open terminal 144, a switch activation terminal 146, an output terminal 148, and a common terminal 149. The AC transfer switch output terminal 148 is electrically coupled to AC output terminal 180, normally closed terminal 142 is electrically coupled to power inverter output terminal 114, and normally open terminal 144 is electrically coupled to AC input terminal 160. Through this arrangement, the source of AC output power is switchable between inverted AC power from power inverter 110 and external AC power provided to AC input terminal 160.

The switch state of AC transfer switch 140 is determined by the power inverter state as indicated at status terminal 118 of power inverter 110. The control circuit is represented in FIG. 2 as a relay coil 147 mechanically coupled to the contact set of the switch, but may be any type of electrically operated single-pole double-throw switch. Relay coil 147 is connected to a ground potential at common terminal 149 and to status terminal 118 of power inverter 110 at switch activation terminal 146. Thus, when power inverter 110 presents a logic level "1" to status terminal 118, AC transfer switch 140 is energized such that AC input terminal 160 is electrically coupled to AC output terminal 180. When status terminal 118 of power inverter 110 presents a logic level "0", AC transfer switch 140 is relaxed into its default position of AC output terminal 180 being coupled to output terminal 114 of power inverter 110.

With power detect terminal 126 of AC power converter 120 coupled to standby terminal 116 of power inverter 110 and the output of status terminal 118 being determined by the state of standby terminal 116, the AC power source coupled to AC output terminal 180 may be determined by whether or not mobile power supply 10 is connected to an external AC power source at AC input terminal 160. When the external AC power source is detected at the input terminal 122 of AC power converter 120, power detect terminal 126 indicates such by outputting a logic level "1". As power detect terminal 126 is coupled to standby terminal 116 of power inverter 110, power inverter 110 is placed in a standby state, i.e., AC output power at power inverter output terminal 114 of power inverter 110 is inhibited. The inhibited state of power inverter 110 is indicated on status terminal 118, which is placed in a logic level "1" state. The logic level "1" on status terminal 118 is transmitted to switch activation terminal 146 of AC transfer switch 140 which excites relay coil 147 to force the contact set into its secondary position (i.e., normally closed contacts open and normally opened contacts closed). The contact set of AC transfer switch 140 being in its secondary position creates a direct path from AC input terminal 160 to AC output terminal 180. By contrast, when AC transfer switch 140 is in its default position and power inverter 110 is allowed to supply AC output power to its output terminal 114, AC output power is transferred from power inverter 110 to AC output terminal 180 through normally closed terminal 142 and AC transfer switch output terminal 148.

In certain power supply/welder deployment situations, it may be desirable to override the transferral of AC output power from the power inverter 110 to the external AC power source coupled to AC input terminal 160. Such is the case when great lengths of an extension cord of small wire gauge are used to supply power to heavy duty AC power equipment. Further, if the external AC power source is located a great distance from mobile power supply 10, there is an additional length of extension cord to introduce an impedance to power transfer to the power tool. As power inverter 110 is equipped with a well-regulated output, it may be desired to use the output of power inverter 110 for operating AC-powered equipment coupled to AC output terminal 180 and the external AC power source coupled to AC input terminal 160 for replenishing primary DC power source 20. To that end, AC output mode switch 150 may be optionally interposed between power detect terminal 126 of AC power converter 120 and standby terminal 116 of power inverter 110. With AC output mode switch 150 open, the power detect indication from power detect terminal 126 cannot be transmitted to standby terminal 116. Thus, power inverter 110 remains in its normal operating state regardless of the availability of an external AC power source. Alternately, with AC output mode switch 150 closed, power detect indication from AC power converter 120 is transmitted to standby terminal 116 and the system operates as discussed above.

Mobile tool and welder power supply 10 may be optionally coupled to an external DC power source via DC input terminal 170 for providing a DC replenishing current to primary DC power source 20. In the preferred embodiment, DC power converter 130 accepts at its input terminal 132 a wide range of DC voltages and provides at its output terminal 134 a regulated DC voltage at the system output voltage level. DC power converter output terminal 134 is electrically coupled to primary DC power source 20 via DC supply line 500.

The outputs of both AC power converter 120 and DC power converter 130 are simultaneously connected to primary DC input terminal 195. As both converters are connected in parallel, each converter is equipped with output isolation to prevent current from either of the other converter or the primary DC power source from damaging the converter.

Figure 4:
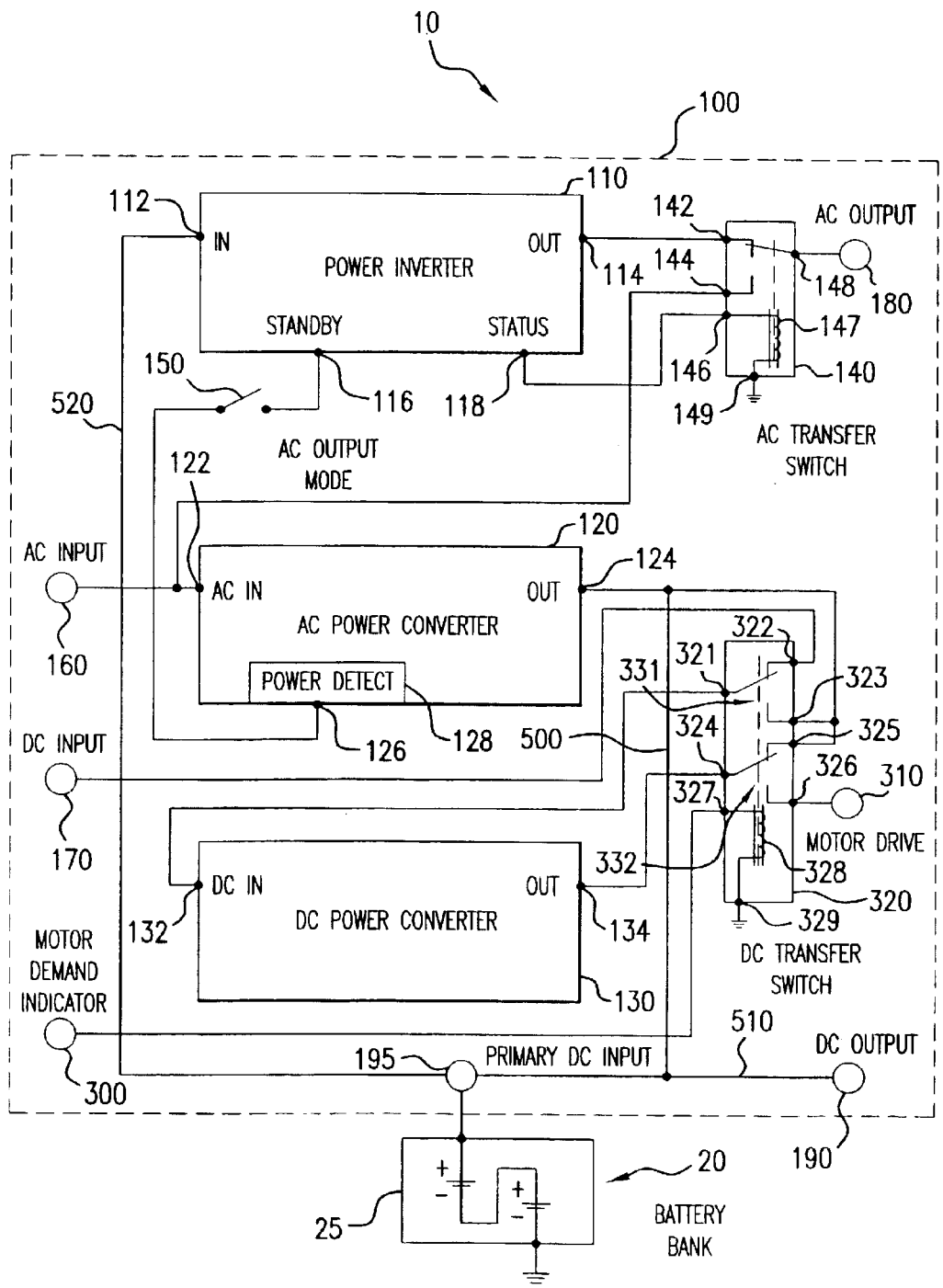
FIG. 4 is a block diagram illustrating a third embodiment of the present invention.

A second embodiment of the integrated mobile tool and welder power supply of the present invention is illustrated in FIG. 4 where like designations with FIG. 2 denote like elements. The embodiment of FIG. 4 includes additional circuitry to drive a DC motor independently of primary DC output coupled to DC output terminal 190. This configuration is particularly useful for supplying DC power to DC welding equipment having a DC motor for feeding spooled welding wire. Separating the motor and welding circuits allows the motor be driven by a stabilized DC source to prevent fluctuations on the primary welding supply line from influencing the speed at which the motor feeds the welding wire.

The system of FIG. 4 is essentially the same as the system illustrated in FIG. 2, with the exception of the inclusion of DC transfer switch 320, motor drive output terminal 310, and motor demand indicator terminal 300. Moreover, DC power converter 130 is electrically coupled to DC transfer switch 320 such that when DC transfer switch 320 is activated, DC power from DC power converter 130 is supplied to motor drive terminal 310.

DC transfer switch 320 contains two contact sets 331, 332 mechanically coupled to a switch activation mechanism, shown in FIG. 3 as relay coil 328. Each contact set 331, 332 is defined by a central terminal 321, 324, a normally closed terminal 322, 325, and a normally open terminal 323, 326. DC transfer switch 320 further includes a switch activation terminal 327 and common terminal 329 which are electrically coupled to the switch activation mechanism. Central terminal 321 of contact set 331 is connected to DC power converter input terminal 132 and central terminal 324 of contact set 332 is coupled to DC power converter output terminal 134. Normally closed terminal 322 of contact set 331 is electrically coupled to DC input terminal 170 and normally open terminal 323 is connected to primary DC input terminal 195. Normally closed terminal 325 of contact set is coupled to DC recharging supply line 500 and normally open terminal 326 is electrically coupled to motor drive output terminal 310. Motor demand indicator terminal 300 is connected to DC transfer switch activation terminal 327 and common terminal 329 is connected to chassis ground. DC transfer switch 320 is configured such that when motor demand indicator terminal 300 is at logic level "1", the switch is activated, i.e., relay coil 328 is energized and contact sets 331, 332 are placed in their switched positions. When motor demand indicator terminal 300 is at logic level "0", relay coil 328 is de-energized and contact sets 331, 332 revert to their default positions.

When DC transfer switch 320 is in its default position, DC power converter 130 is connected to the rest of the system as illustrated in FIG. 2. That is, DC input terminal 170 is electrically coupled to DC power converter input terminal 132 and DC power converter output terminal 134 is coupled to supply line 500 so as to provide a replenishing current to primary DC power source 20. If the motor demand indicator coupled to motor demand indicator terminal 300 goes high, i.e., switches state to logic level "1", DC transfer switch 320 is activated and DC power converter input terminal 132 is electrically coupled to primary DC input terminal 195 and DC power converter output terminal 134 is electrically coupled to motor drive output terminal 310. Thus, power for the DC motor coupled to motor drive terminal 310 is derived from primary DC power source 20 as isolated and regulated by DC power converter 130. The motor demand indicator coupled to motor demand indicator terminal 300 may be a user activated mechanical switch, a current sensing device, or the like.

Figure 5:
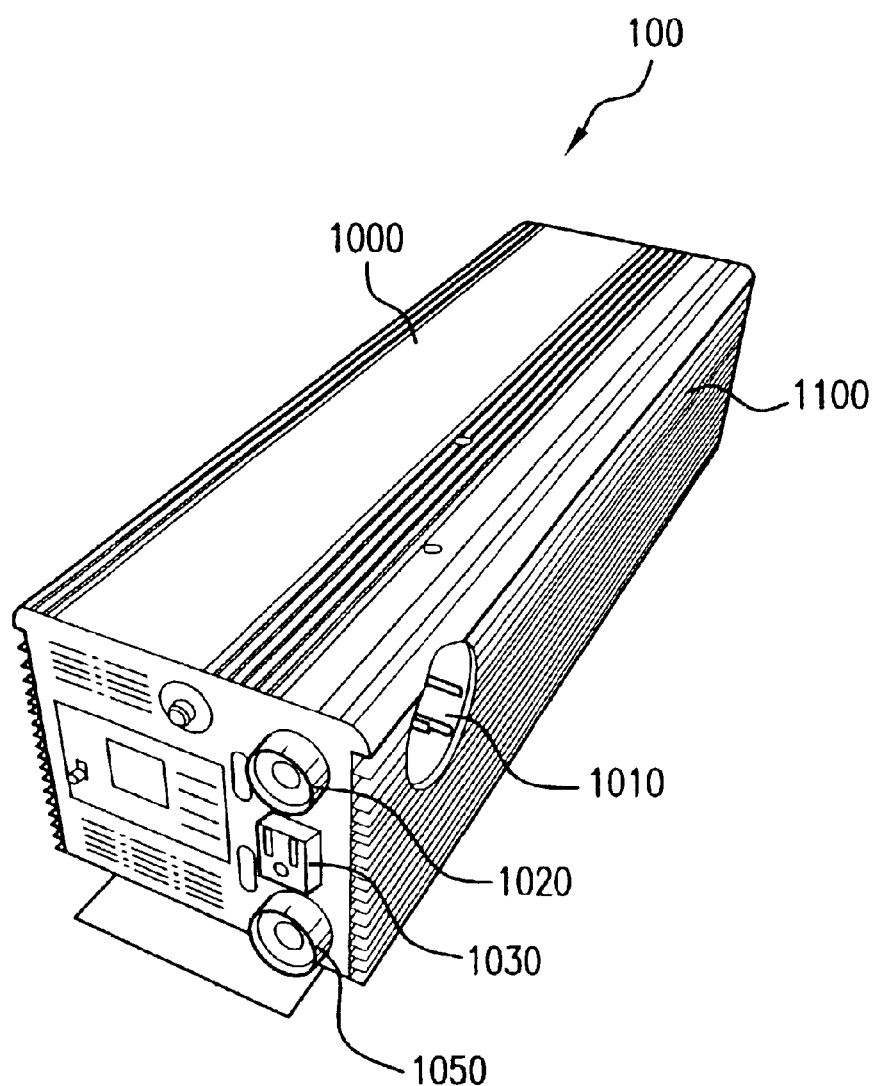
FIG. 5 is an illustration of a typical housing used to enclose the power supply chassis of the present invention; and, FIG. 6 is an illustration of the present invention as part of a wheeled mobile tool and welder power supply system.

The integrated mobile tool and welder power supply of the instant invention results in a compact and convenient system when placed in a suitable housing. Such a housing is illustrated in FIG. 5, wherein power supply chassis 100 is assembled in a housing 1000 constructed from a sturdy material such as extruded aluminum. Power supply chassis housing 1000 may have formed on its outer surface a plurality of cooling fins 1100 for maintaining a suitable operating temperature of the various components within housing 1000.

Power supply chassis housing 1000 has coupled to its outer surface a plurality of standard electrical connectors for receiving external power from external power sources and for supplying power to tools and equipment. The connectors include, but are not limited to, AC input connector 1010 for coupling to AC input terminal 160, isolated DC output connector 1020 for coupling to DC output terminal 190, AC output connector 1030 for coupling to AC output terminal 180, ground connector 1050 for connecting to the isolated system DC ground, and DC input connectors (not shown) for electrically coupling to primary DC input terminal 190 and to the primary DC ground bus.

Figure 6:
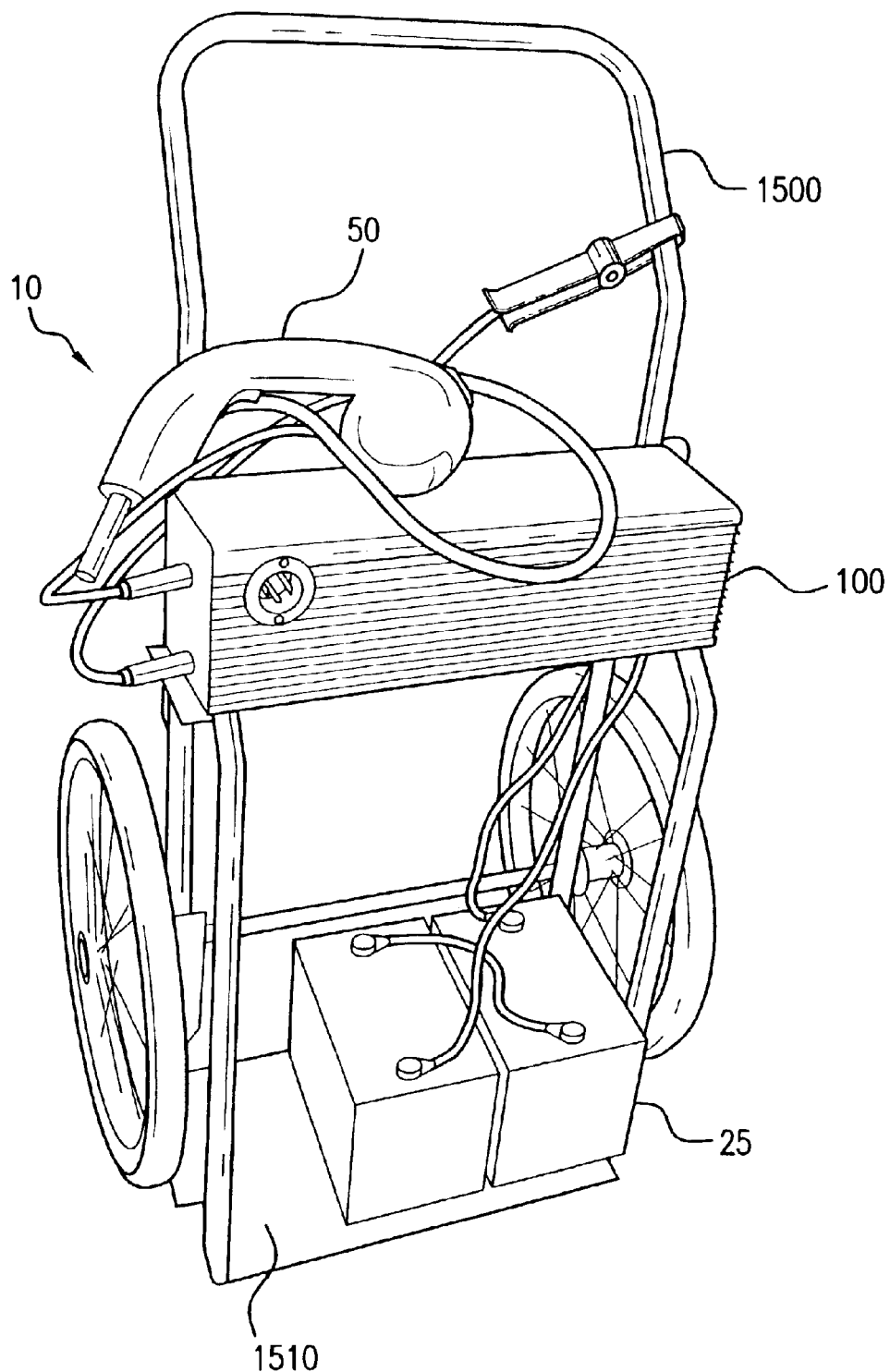

The compact design of mobile power supply 10 allows it to be easily transported from one remote location to another by vehicle or by means of a wheeled cart as illustrated in FIG. 6. As is shown in the Figure, power supply chassis 100 is mechanically attached to a wheeled cart 1500. Battery bank 25 is transported on carrier 1510 of cart 1500. DC welder 50 is electrically coupled to power supply chassis 100, resulting in a convenient, easily transported, compact DC welding system.

Although the invention has been described herein in conjunction with specific embodiments thereof, many alternatives, modifications, and variations will be apparent to those skilled in the art. The present invention is intended to embrace all such alternatives, modifications, and variations that fall within the spirit and broad scope of the appended claims.

What is claimed is:

1. A integrated mobile tool and welder power supply comprising:
    a primary DC power source;
    a DC output terminal coupled to said primary DC power source;
    a DC input terminal for receiving an external DC power signal;
    an AC input terminal for receiving an external AC power signal;
    an AC output terminal;
    a power inverter for converting a DC power signal to an inverted AC power signal, said power inverter being coupled to said primary DC power source;
    an AC power detector coupled to said power inverter for detecting said external AC power signal and providing an indication thereof upon detecting said external AC power signal;
    an AC transfer switch coupled to said power inverter and said AC input terminal for selectively coupling said AC output terminal to said power inverter or said AC input terminal, said selective coupling being determined by said indication of detecting said external AC power signal; and
    at least one power converter for converting an AC power signal or a DC power signal to a DC power signal for replenishing said primary DC power source to maintain a predetermined power level.

2. The integrated mobile tool and welder power supply recited in claim 1, wherein said primary DC power source includes a plurality of storage batteries connected in series.

3. The integrated mobile tool and welder power supply recited in claim 2, wherein each of said at least one power converter includes a regulated battery charging circuit for replenishing said plurality of storage batteries to maintain said predetermined power level.

4. The integrated mobile tool and welder power supply recited in claim 1, wherein one of said at least one power converter is an AC-DC converter coupled to said AC input terminal.

5. The integrated mobile tool and welder power supply recited in claim 1, wherein one of said at least one power converter is a DC-DC converter coupled to said DC input terminal.

6. The integrated mobile tool and welder power supply recited in claim 1, wherein said power inverter, said AC power detector and said AC transfer switch are assembled on and interconnected by a single printed circuit board.

7. The integrated mobile tool and welder power supply recited in claim 1, wherein said power inverter, said AC power detector, said AC transfer switch and said at least one power converter are contained in a housing.

8. The integrated mobile tool and welder power supply recited in claim 7, wherein said DC output terminal, said DC input terminal, said AC output terminal and said AC input terminal are coupled to a plurality of electrical connectors disposed on an exterior surface of said housing.

9. An integrated mobile tool and welder power supply comprising:
    a primary DC power source;
    a DC output terminal coupled to said primary DC power source;
    a DC input terminal for receiving an external DC power signal;
    an AC input terminal for receiving an external AC power signal;
    an AC output terminal;
    a power inverter for converting a DC power signal to an inverted AC power signal, said power inverter being coupled to said primary DC power source;
    an AC power detector coupled to said power inverter for detecting said external AC power signal and providing an indication upon detecting said external AC power signal;
    an AC transfer switch coupled to said power inverter and said AC input terminal for selectively coupling said AC output terminal to said power inverter or said AC input terminal, said selective coupling being determined by said indication of detecting said external AC power signal;
    at least one power converter for converting an AC power signal or a DC power signal to a DC power signal for replenishing said primary DC power source to maintain a predetermined power level.

10. The integrated mobile tool and welder power supply recited in claim 9 further comprising an AC output mode selection switch electrically interposed between said power inverter and said AC power detector, said AC output mode selection switch for selectively enabling or prohibiting reception of said standby signal at said power inverter from said AC power detector.

11. The integrated mobile tool and welder power supply recited in claim 10 wherein said AC output mode selection switch is a user-activated manual switch.

12. The integrated mobile tool and welder power supply as recited in claim 9, wherein said primary DC power source includes a plurality of storage batteries connected in series.

13. The integrated mobile tool and welder power supply recited in claim 12, wherein each of said at least one power converter includes a regulated battery charging circuit for replenishing said plurality of storage batteries to maintain said predetermined power level.

14. The integrated mobile tool and welder power supply recited in claim 9, wherein said status signal received at said AC transfer switch controls said selective coupling of said AC output terminal to said power inverter or said AC input terminal.

15. The integrated mobile tool and welder power supply recited in claim 9, wherein receiving said standby signal at said power inverter precipitates transmission of said status signal to said AC transfer switch.

16. The integrated mobile tool and welder power supply recited in claim 9, wherein one of said at least one power converter is an AC-DC converter coupled to said AC input terminal.

17. The integrated mobile tool and welder power supply as recited in claim 16, wherein said AC power detector is an input circuit component of said AC-DC converter.

18. The integrated mobile tool and welder power supply recited in claim 9, wherein one of said at least one power converter is a DC-DC converter coupled to said DC input terminal.

19. The integrated mobile tool and welder power supply recited in claim 18, further comprising:

a motor drive output terminal for coupling to a DC motor and supplying DC motor power thereto;

a motor demand indicator for selectively transmitting a motor on signal or a motor off signal;

a DC transfer switch electrically interposed between said DC-DC converter and said DC input terminal and coupled to said motor demand indicator, said DC transfer switch configured to selectively couple said DC-DC converter to said motor drive output terminal or to said primary DC power source.

20. The integrated mobile tool and welder power supply recited in claim 19, wherein said motor demand indicator is a user-activated manual switch.

21. The integrated mobile tool and welder power supply recited in claim 19, wherein said DC transfer switch selectively couples said DC input terminal or said primary DC power source to said DC-DC converter.

22. The integrated mobile tool and welder power supply as recited in claim 21, wherein said DC-DC converter is coupled to said DC input terminal and said primary DC power source when said DC transfer switch receives said motor off signal from said motor demand indicator.

23. The integrated mobile tool and welder power supply recited in claim 21, wherein said DC-DC converter is coupled to said primary DC power source and said motor drive output terminal when said DC transfer switch receives said motor on signal from said motor demand indicator.

24. The integrated mobile tool and welder power supply recited in claim 9, wherein said power inverter, said AC power detector, said AC transfer switch and said at least one power converter are contained in a housing.

25. The integrated mobile tool and welder power supply recited in claim 24, wherein said DC output terminal, said DC input terminal, said AC output terminal and said AC input terminal are coupled to a plurality of electrical connectors disposed on an exterior surface of said housing.

26. The integrated mobile tool and welder power supply recited in claim 24, wherein said housing is formed from extruded aluminum.

27. The integrated mobile tool and welder power supply recited in claim 26, wherein said housing includes a plurality of cooling fins formed on the exterior thereof.

28. The integrated mobile tool and welder power supply recited in claim 24, wherein said housing and said primary DC power source are installed on a wheeled cart.

\* \* \* \* \*